US012810442B2

(12) United States Patent
Figov et al.

(10) Patent No.: US 12,810,442 B2
(45) Date of Patent: Nov. 24, 2026

(54) OBJECT TRACKING WITH SHOT TRANSITION DETECTION AND DYNAMIC QUEUE RESIZING

(71) Applicant: Microsoft Technology Licensing, LLC, Redmond, WA (US)

(72) Inventors: Zvi Figov, Modiin (IL); Yonit Hoffman, Herzeliya (IL); Mordechai Kadosh, Raanana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 18/209,374

(22) Filed: Jun. 13, 2023

(65) Prior Publication Data

US 2024/0420342 A1 Dec. 19, 2024

Related U.S. Application Data

(60) Provisional application No. 63/462,200, filed on Apr. 26, 2023.

(51) Int. Cl.
*G06T 7/246* (2017.01)
*G06T 7/11* (2017.01)
(Continued)

(52) U.S. Cl.
CPC ................ *G06T 7/248* (2017.01); *G06T 7/11* (2017.01); *G06T 7/13* (2017.01); *G06T 7/223* (2017.01);
(Continued)

(58) Field of Classification Search
CPC ............. G06T 7/248; G06T 7/11; G06T 7/13; G06T 7/223; G06T 7/70; G06T 2207/10016;
(Continued)

(56) References Cited

U.S. PATENT DOCUMENTS

| | | | | |
|---|---|---|---|---|
| 6,901,110 B1 * | 5/2005 | Tsougarakis | ........... | H04N 19/17 375/240 |
| 2017/0200280 A1 * | 7/2017 | Castellani | ............. | H04N 5/145 |

(Continued)

FOREIGN PATENT DOCUMENTS

JP 2015050591 A * 3/2015

OTHER PUBLICATIONS

Huang et al., "Shot Change Detection via Local Keypoint Matching," in IEEE Transactions on Multimedia, vol. 10, No. 6, pp. 1097-1108, Oct. 2008, doi: 10.1109/TMM.2008.2001374 (Year: 2008).*

(Continued)

*Primary Examiner* — Vu Le
*Assistant Examiner* — Rachel Anne Ometz
(74) *Attorney, Agent, or Firm* — Klarquist Sparkman, LLP

(57) ABSTRACT

An object tracking tool integrates scene transition detection and/or dynamic queue resizing. By integrating shot transition detection, the object tracking tool can change which operations are performed depending on whether a shot transition has been detected. For example, if a shot transition is not detected, lower-complexity interpolation operations can be performed to determine spatial information for objects, instead of using higher-complexity object detection operations, which can reduce computational complexity. As another example, depending on whether a shot transition has been detected, the object tracking tool can adjust operations performed when associating identifiers with objects, which can improve accuracy of object tracking operations. With dynamic queue resizing, an object tracking tool can selectively adjust the maximum size of a queue used to store frames for object tracking. Dynamic queue resizing can
(Continued)

reduce the likelihood of the queue being empty, which could cause the object tracking tool to be idle or stalled.

20 Claims, 6 Drawing Sheets

(51) Int. Cl.
*G06T 7/13* (2017.01)
*G06T 7/223* (2017.01)
*G06T 7/70* (2017.01)

(52) U.S. Cl.
CPC ...... *G06T 7/70* (2017.01); *G06T 2207/10016* (2013.01); *G06T 2207/20084* (2013.01)

(58) Field of Classification Search
CPC .......... G06T 2207/20084; G06T 7/246; G06V 20/49
See application file for complete search history.

(56) References Cited

U.S. PATENT DOCUMENTS

| | | | | |
|---|---|---|---|---|
| 2017/0223359 A1* | 8/2017 | Kim | ........................ | G06V 20/49 |
| 2018/0129934 A1* | 5/2018 | Tao | ........................ | G06N 3/084 |
| 2020/0126241 A1* | 4/2020 | Wang | ..................... | G06N 3/048 |

OTHER PUBLICATIONS

Xu et al., "A shot boundary detection method for news video based on object segmentation and tracking," 2008 International Conference on Machine Learning and Cybernetics, Kunming, China, 2008, pp. 2470-2475, doi: 10.1109/ICMLC.2008.462082 (Year: 2008).*
Hameed, "Video shot detection by motion estimation and compensation," 2009 International Conference on Emerging Technologies, Islamabad, Pakistan, 2009, pp. 241-246, doi: 10.1109/ICET.2009.5353168 (Year: 2009).*
Hassanien et al., "Large-scale, Fast and Accurate Shot Boundary Detection through Spatio-temporal Convolutional Neural Networks," arXiv:1705.03281 v2 (Year: 2017).*
Ciaparrone et al., "Deep Learning in Video Multi-Object Tracking: A Survey", arXiv:1907.12740v4 (Year: 2019).*
Li et al., "State-aware Re-identification Feature for Multi-target Multi-camera Tracking", CVF Open Access, 2019 (Year: 2019).*
Bochinski et al., "High-Speed Tracking-by-detection Without Using Image Information," Int'l Workshop on Traffic and Street Surveillance for Safety and Security, 7 pp. (Aug. 2017).
Ciaparrone et al., "Deep Learning in Video Multi-object Tracking: A Survey," *Neurocomputing*, vol. 381, pp. 61-88 (Mar. 2020).
Ciaparrone et al., "Deep Learning in Video Multi-object Tracking: A Survey," arxiv:1907.12740v4, 42 pp. (Nov. 2019).
Gargi et al., "Performance Characterization of Video-Shot-Change Detection Methods," *IEEE Trans. On Circuits and Systems for Video Technology*, vol. 10, No. 1, 13 pp. (Feb. 2000).
Hassanien et al., "Large-scale, Fast and Accurate Shot Boundary Detection through Spatio-temporal Convolutional Neural Networks," arXiv:1705.03281v2, 20 pp. (Jul. 2017).
Li et al., "State-aware Re-identification Feature for Multi-target Multi-camera Tracking," arXiv:1906.01357v1, 11 pp. (Jun. 2019).
Swain et al., "Color Indexing," International Journal of Computer Vision, vol. 7, No. 1, pp. 11-32 (Jan. 1991).
Wojke et al., "Simple Online and Realtime Tracking with a Deep Association Metric," arXiv:1703.07402v1, 5 pp. (Mar. 2017).
Heng et al., "Integrated Shot Boundary Detection Using Object-based Technique," ICIP Int'l Conf. on Image Processing, vol. 3, pp. 289-293 (Oct. 1999).
Idris et al., "Review of Image and Video Indexing Techniques," Journal of Visual Communication and Image Representation, vol. 8, No. 2, pp. 146-166 (Jun. 1997).
International Search Report and Written Opinion dated Jun. 28, 2024, from International Patent Application No. PCT/US2024/023486, 12 pp.
Communication pursuant to Rules 161(1) and 162 EPC dated Dec. 3, 2025, from European Patent Application No. 24724693.7, 3 pp.
International Preliminary Report on Patentability dated Nov. 6, 2025, from International Patent Application No. PCT/US2024/023486, 7 pp.

* cited by examiner

600

OBJECT TRACKING WITH SHOT TRANSITION DETECTION AND DYNAMIC QUEUE RESIZING

RELATED APPLICATIONS

This application claims the benefit of U.S. Provisional Pat. App. No. 63/462,200, filed Apr. 26, 2023, the disclosure of which is hereby incorporated by reference.

BACKGROUND

In a computer system, an object tracking tool can be used to gain insights about content in a video sequence. For example, an object tracking tool can be used to detect and track objects throughout a video sequence. As part of detecting and tracking objects, some object tracking tools add identifiers to objects in a video sequence, with the goal of assigning a unique identifier that is persistent across different occurrences of an object in frames throughout the video sequence. Object tracking can be used to track people, faces, or other "objects" in a video sequence. The results of object tracking can be used for other applications, such as building an index for a video sequence or creating links to appearances of objects in a video sequence.

Object tracking presents many challenges. Object tracking can be computationally expensive in terms of processor utilization and memory utilization. Object tracking tools can also suffer from low accuracy, particularly when they are used to track objects in types of video for which they were not designed or optimized. Many object tracking tools are adapted for object tracking in surveillance video from a single camera or other video from a single camera. Such object tracking tools tend to perform poorly when used to track objects in video sequences that mix content from multiple cameras. The performance of object tracking tools can be especially poor when a video sequence has been edited to include shot transitions such as abrupt scene changes, viewpoint changes within a scene, or gradual scene changes, which can be zoom-in, zoom-out, fade-in, fade-out, or wipe effects, or which can be gradual cross-overs between scenes. Although shot transitions may appear in various types of video content, video in the media and entertainment domain often includes complex shot transitions, which may complicate object tracking.

SUMMARY

In summary, the detailed description presents innovations in object tracking with shot transition detection and/or dynamic queue resizing. By integrating shot transition detection, an object tracking tool can change which operations are performed depending on whether a shot transition has been detected. This can reduce the overall computational complexity of object tracking operations and also improve the accuracy of object tracking operations. With dynamic queue resizing, an object tracking tool can selectively adjust the maximum size of a queue used to store frames of a video sequence for object tracking. This can improve throughput and processor utilization for the object tracking tool by reducing the likelihood of the queue being empty, which could cause the object tracking tool to be idle or stalled. The innovations described herein can improve results of object tracking for arbitrary video content, including video for media and entertainment.

According to a first aspect of the techniques and tools described herein, an object tracking tool integrates scene transition detection. The object tracking tool reads a given frame of a video sequence. The object tracking tool determines whether an object detection condition is satisfied for the given frame. In doing so, the object tracking tool determines whether the given frame depicts a shot transition. The object detection condition is satisfied if the given frame depicts the shot transition. In some example implementations, in determining whether the object detection condition is satisfied for the given frame, the object tracking tool can also determine whether a frame counter has reached a threshold (in which case the object detection condition is satisfied) and/or determine whether a shot transition occurs anywhere between two end-point frames on opposite sides of the given frame (in which case the object detection condition is satisfied).

The object tracking tool tracks one or more objects in the given frame. For example, the object(s) can be persons, faces, vehicles, logos, or other objects parameterized in one or more models used in the tracking. At least some operations of the tracking depend on a result of determining whether the object detection condition is satisfied for the given frame.

For example, when determining spatial information for the object(s) in the given frame, the object tracking tool changes operations depending on whether the object detection condition is satisfied. If the object detection condition is satisfied, the object tracking tool gets results of object detection operations to determine the spatial information for the object(s) in the given frame. On the other hand, if the object detection condition is not satisfied, the object tracking tool performs interpolation operations to determine the spatial information for the object(s) in the given frame. Typically, interpolation operations have much lower computational complexity than object detection operations. In this way, overall utilization of resources by the object tracking tool can be reduced when determining the spatial information for the object(s) in the given frame.

As another example, when updating tracking information to associate the object(s) in the given frame with corresponding objects in other frames of the video sequence, the object tracking tool changes operations depending on whether the given frame depicts a shot transition. If the given frame depicts a shot transition, the object tracking tool uses only visual information for the object(s) in the given frame (and does not use spatial information for the object(s) in the given frame) when updating the tracking information. On the other hand, if the given frame does not depict a shot transition, the object tracking tool uses both the spatial information and the visual information for the object(s) in the given frame when updating the tracking information. In this way, the accuracy of object tracking operations can be improved.

According to a second aspect of the techniques and tools described herein, an object tracking tool integrates dynamic queue resizing. The object tracking tool sets a maximum queue size for a queue of frames of a video sequence. During tracking of objects in one or more of the frames of the video sequence, the object tracking tool selectively adjusts (e.g., increases) the maximum queue size depending on whether a queue condition is satisfied. For example, the queue condition is satisfied if (1) fullness of the queue has reached the maximum queue size after the maximum queue size was last set or selectively adjusted and (2) the fullness of the queue subsequently reaches an empty state. Dynamic queue resizing can reduce the likelihood of the queue being empty, which could cause the object tracking tool to be idle or stalled. In this way, dynamic queue resizing can improve throughput and processor utilization for the object tracking tool.

The innovations described herein can be implemented as part of a method, as part of a computer system (physical or virtual, as described below) configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

DETAILED DESCRIPTION

The detailed description presents innovations in object tracking with shot transition detection and/or dynamic queue resizing.

By integrating shot transition detection, an object tracking tool can change which operations are performed depending on whether a shot transition has been detected. For example, if a shot transition is not detected, lower-complexity interpolation operations can be performed to determine spatial information for objects, instead of using higher-complexity object detection operations. This can reduce the overall computational complexity of object tracking operations. As another example, depending on whether a shot transition has been detected, an object tracking tool can adjust operations performed when associating identifiers with objects. This can improve the accuracy of object tracking operations by making it less likely for identifiers to be assigned to objects incorrectly.

With dynamic queue resizing, an object tracking tool can selectively adjust the maximum size of a queue used to store frames of a video sequence for object tracking. Dynamic queue resizing can reduce the likelihood of the queue being empty, which could cause the object tracking tool to be idle or stalled. Thus, dynamic queue resizing can improve throughput and processor utilization for the object tracking tool.

Object tracking is challenging for video in the media and entertainment domain. Such video often includes complex shot transitions, which complicate object tracking. In some example implementations, an object tracking tool performs well for arbitrary video content, including video for media and entertainment. In some cases, the results of object tracking are invariant to video editing, such that objects are consistently and correctly tracked across shot transitions.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure. The following description is, therefore, not to be taken in a limited sense.

I. Example Computer Systems.

Figure 1:
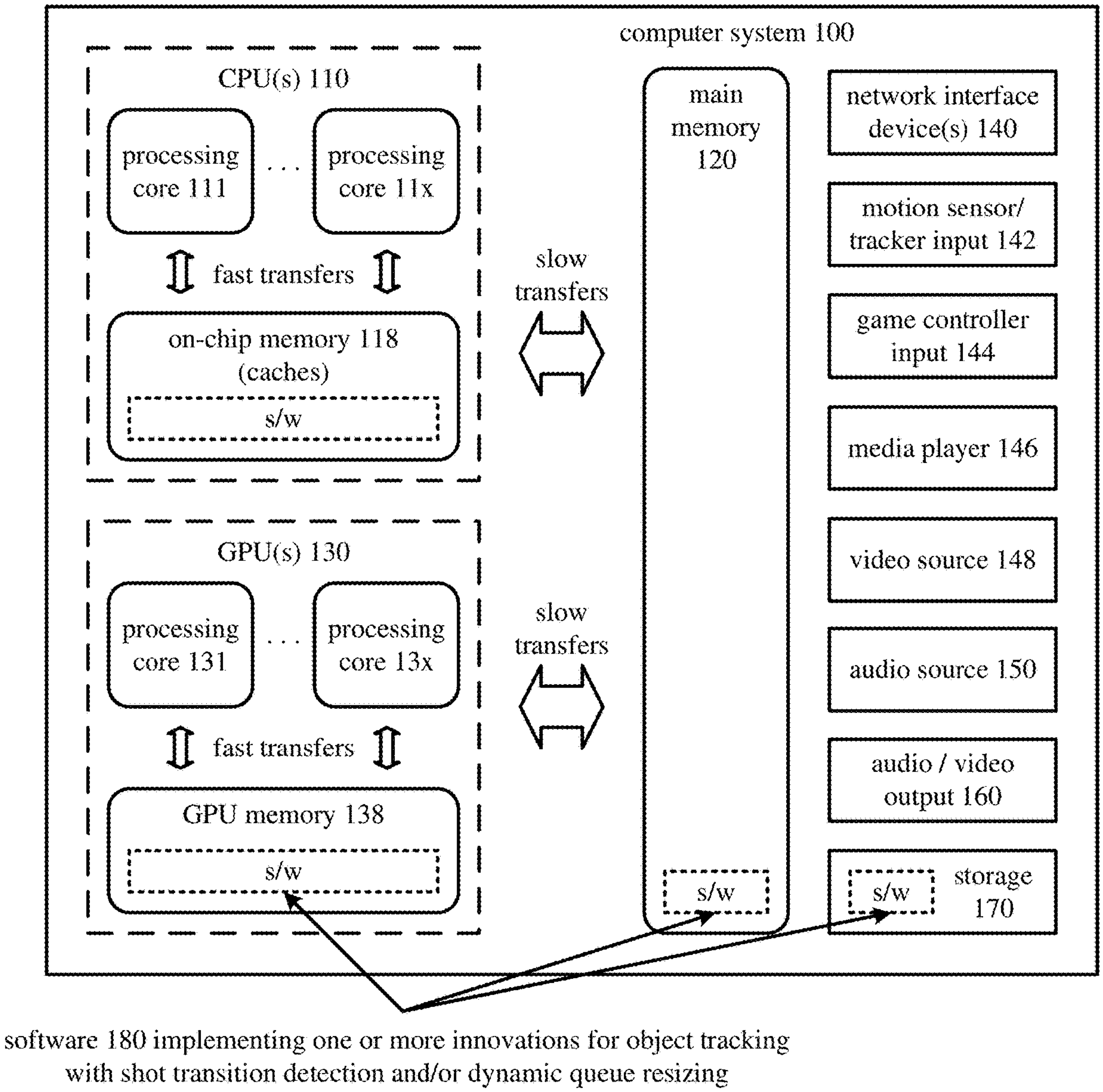
FIG. 1 is a diagram illustrating an example computer system in which some described embodiments can be implemented.

FIG. 1 illustrates a generalized example of a suitable computer system (100) in which several of the described innovations may be implemented. The innovations described herein relate to object tracking with shot transition detection and/or dynamic queue resizing. The computer system (100) is not intended to suggest any limitation as to scope of use or functionality, as the innovations may be implemented in diverse computer systems, including special-purpose computer systems.

With reference to FIG. 1, the computer system (100) includes one or more processing cores (110 . . . 11*x*) and local memory (118) of a central processing unit ("CPU") or multiple CPUs. The processing core(s) (110 . . . 11*x*) are, for example, processing cores on a single chip, and execute computer-executable instructions. The number of processing core(s) (110 . . . 11*x*) depends on implementation and can be, for example, 4 or 8. The local memory (118) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (110 . . . 11*x*). Alternatively, the processing cores (110 . . . 11*x*) can be part of a system-on-a-chip ("SoC"), application-specific integrated circuit ("ASIC"), or other integrated circuit.

The local memory (118) can store software (180) implementing aspects of the innovations for object tracking with shot transition detection and/or dynamic queue resizing, for operations performed by the respective processing core(s) (110 . . . 11*x*), in the form of computer-executable instructions. In FIG. 1, the local memory (118) is on-chip memory such as one or more caches, for which access operations, transfer operations, etc. with the processing core(s) (110 . . . 11$x$) are fast.

The computer system (100) also includes processing cores (130 . . . 13$x$) and local memory (138) of a graphics processing unit ("GPU") or multiple GPUs. The number of processing cores (130 . . . 13$x$) of the GPU depends on implementation. The processing cores (130 . . . 13$x$) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (138) may be volatile memory (e.g., registers, cache, RAM), non-volatile memory (e.g., ROM, EEPROM, flash memory), or some combination of the two, accessible by the respective processing cores (130 . . . 13$x$). The GPU memory (138) can store software (180) implementing aspects of the innovations for object tracking with shot transition detection and/or dynamic queue resizing, for operations performed by the respective processing cores (130 . . . 13$x$), in the form of computer-executable instructions such as shader code.

The computer system (100) includes main memory (120), which may be volatile memory (e.g., RAM), non-volatile memory (e.g., ROM, EEPROM, flash memory), or some combination of the two, accessible by the processing core(s) (110 . . . 11$x$, 130 . . . 13$x$). The main memory (120) stores software (180) implementing aspects of the innovations for object tracking with shot transition detection and/or dynamic queue resizing, in the form of computer-executable instructions. In FIG. 1, the main memory (120) is off-chip memory, for which access operations, transfer operations, etc. with the processing cores (110 . . . 11$x$, 130 . . . 13$x$) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA"). A "processing system" is a set of one or more processors, which can be located together or distributed across a network.

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi® transceivers, an Ethernet® port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (100) optionally includes a motion sensor/tracker input (142) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

The computer system (100) optionally includes a game controller input (144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (146) and video source (148). The media player (146) can play DVDs, Blu-Ray™ discs, other disc media and/or other formats of media. The video source (148) can be a camera input that accepts video input in analog or digital form from a video camera, which captures natural video. Or, the video source (148) can be a screen capture module (e.g., a driver of an operating system, or software that interfaces with an operating system) that provides screen capture content as input. Or, the video source (148) can be a graphics engine that provides texture data for graphics in a computer-represented environment. Or, the video source (148) can be a video card, TV tuner card, or other video input that accepts input video in analog or digital form (e.g., from a cable input, high definition multimedia interface ("HDMI") input or other input).

An optional audio source (150) accepts audio input in analog or digital form from a microphone, which captures audio, or other audio input.

The computer system (100) optionally includes a video output (160), which provides video output to a display device. The video output (160) can be an HDMI output or other type of output. An optional audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing aspects of the innovations for object tracking with shot transition detection and/or dynamic queue resizing.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Object Tracking with Shot Transition Detection and/or Dynamic Queue Resizing.

This section describes innovations in object tracking with shot transition detection and/or dynamic queue resizing.

In some examples described herein, an object tracking tool uses an approach based on "tracking by detection" as well as extraction of visual information using embeddings. An early approach to tracking by detection is described in Wojke et al., "Simple Online and Realtime Tracking with a Deep Association Metric, 5 pp. (2017). Other approaches to tracking by detection, including tracking of video from multiple cameras, are described in Ciaparrone et al, "Deep Learning in Video Multi-Object Tracking: a Survey" (2020) ("Ciaparrone paper").

In general, a tracking-by-detection approach can use an object detector to determine spatial information for objects in a video sequence and use embeddings to extract visual information for the objects. An object can be tracked between frames of the video sequence using the spatial information and the visual information (also called appearance information).

In some implementations of tracking by detection, an object tracking tool uses an object detector to determine spatial information for objects in each frame of a video sequence. However, object detection operations can be computationally expensive. Some attempts have been made to skip object detection operations for some frames, which reduces the cost associated with object detection operations. Unfortunately, simple attempts to skip object detection operations (e.g., by performing object detection on every other frame or every $N^{th}$ frame) adversely affect the quality of object tracking, especially when there is a shot transition. In particular, tracking often fails across a shot transition, as the spatial information is inconsistent even if the same object appears on both sides of the shot transition. This failure may be observed as an identifier switch ("ID switch") event or fragmentation event.

In an ID switch event, an object is correctly tracked, but the identifier assigned to the object is mistaken. An ID switch happens, for example, if the same identifier is assigned to two different objects in two different frames when associating identifiers with objects, or if different identifiers are assigned to the same object in two different frames when associating identifiers with objects. In some cases, different identifiers are incorrectly assigned to the same object in different frames before and after an occlusion event. One identifier is assigned to an object before disappearance or occlusion, and a different identifier is assigned to the object after reappearance.

In a fragmentation event, the actual trajectory of an object through a series of frames is only partially covered by tracking of the object. The tracking of the objects covers a fragment—less than a threshold percentage such as 80%—of the actual trajectory. Fragmentation happens, for example, if an object is correctly tracked through only part, which is less than the threshold percentage, of the actual trajectory of the object.

A. EXAMPLE SHOT TRANSITION DETECTION

In filmmaking and video production, a shot is a temporal unit. More specifically, a shot is a series of interrelated consecutive pictures (frames) taken contiguously by a single camera and representing a continuous action in time and space. Typically, a shot runs for an uninterrupted period of time.

Shot transition detection (also called shot change detection, shot detection, or cut detection) is a field of research of video processing. Shot transition detection can be used to split up a video sequence into shots, which are separated by shot transitions. A shot transition can be an abrupt transition (also called a sharp transition), which is a sudden transition from one shot to another. For example, an abrupt transition can be scene-to-scene cut-over between two frames. Or, a shot transition can be a gradual transition (also called a soft transition). In a gradual transition, two shots are combined using chromatic, spatial, or spatial-chromatic effects, which gradually replace one shot with another shot. For example, a gradual transition can be a fade-out to black or other color, a fade-in from black or other color, a wipe, a dissolve, or a semi-transparent sequence gradually blending content from two scenes in changing proportions to switch between the two scenes.

In a computer system, shot transition detection can be implemented in many ways. For example, a system calculates a histogram for a current frame using sample values of the current frame. The system measures differences between the histogram for the current frame and a histogram for a previous frame, which is adjacent to the given frame in the video sequence. The histogram for the previous frame may be previously calculated using sample values of the previous frame. The system measures the extent of intersection between the histograms for the current frame and the previous frame, producing a normalized value between 0 and 1 to indicate the extent of differences. For example, a large value indicates more of a difference in color values between the current frame and the previous frame, and hence a smaller intersection between the histograms. The value can be compared to a threshold to identify a shot transition. With a higher threshold, the system catches abrupt transitions but may miss gradual transitions. With a lower threshold, the system may also detect more gradual transitions.

More generally, a system can use any of various approaches to detect whether the given frame depicts a shot transition, thereby producing a result of shot transition detection for the given frame. For additional details about different types of approaches, see Swain et al, "Color Indexing," International Journal of Computer Vision, 7:1, pp. 11-32 (1991); see also Gargi et al., "Performance Characterization of Video-Shot-Change Detection Methods," IEEE Transactions on Circuits and Systems for Video Technology, Vol. 10, No. 1, 13 pp. (2000) and references cited therein; see also Hassanien et al., "Large-scale, Fast and Accurate Shot Boundary Detection through Spatio-temporal Convolutional Neural Networks" and its supplementary material, 20 pp. (2017).

B. INTEGRATING SHOT TRANSITION DETECTION INTO OBJECT TRACKING, IN GENERAL

By integrating shot transition detection, an object tracking tool can change which operations are performed depending on whether a shot transition has been detected. For example, if a shot transition is not detected, lower-complexity interpolation operations can be performed to determine spatial information for objects, instead of using higher-complexity object detection operations. For an object in a current frame between two end-point frames, the interpolation operations estimate spatial information for the object in the current frame as an intermediate value between spatial information for the object in the two end-point frames, respectively. For linear interpolation, the estimated spatial information for the object in the current frame is approximated according to the relative temporal position of the current frame between the two end-point frames. This can reduce the overall computational complexity of object tracking operations and also improve the accuracy of object tracking operations. In many cases, by integrating shot transition detection, an object tracking tool can track objects more quickly and use fewer resources when doing so.

An object tracking tool checks whether an object detection condition is satisfied for a current frame. The object detection condition depends on results of shot transition detection for the current frame. In some example implementations, the object detection condition also depends on there being no shot transition anywhere in the interval between two end-point frames for interpolation, as such a shot transition would interfere with interpolation operations to determine spatial information for the current frame. If the object detection condition is satisfied, the object tracking tool uses object detection operations to determine spatial information for the current frame. If the object detection condition is not satisfied, the object tracking tool can use lower-complexity interpolation operations to determine spatial information for the current frame, assuming certain other interpolation conditions are satisfied. For example, one interpolation condition is that the object has a matching identifier in the two end-point frames, considering the identifiers assigned to the object in the two end-point frames in previous operations (e.g., using a Re-ID model).

In some example implementations, the object detection condition is satisfied if a shot transition has been detected for the current frame OR if the current frame is the $N^{th}$ frame after reset of a frame counter, which happens when the object detection condition is satisfied. Thus, the object detection condition is satisfied for every $N^{th}$ frame, or sooner if a shot transition has been detected. The value of N depends on implementation. For example, in some implementations, N is 5. In general, decreasing N tends to help quality but may increase computational complexity. Conversely, increasing N tends to reduce computational complexity but may hurt quality, except that integration of shot transition detection can allow N to be increased without quality suffering.

As another example, depending on whether a shot transition has been detected, an object tracking tool can adjust operations performed when associating identifiers with objects. This can improve the accuracy of object tracking operations by making it less likely for identifiers to be assigned to objects incorrectly. In particular, if a shot transition has been detected for a current frame, the object tracking tool uses visual information when associating identifiers with objects in the current frame. If no shot transition has been detected for the current frame, the object tracking tool uses both spatial information and visual information when associating identifiers with objects in the current frame. In this way, the likelihood of ID switch events and fragmentation events can be reduced.

C. EXAMPLE OBJECT TRACKING TOOLS

Figure 2:
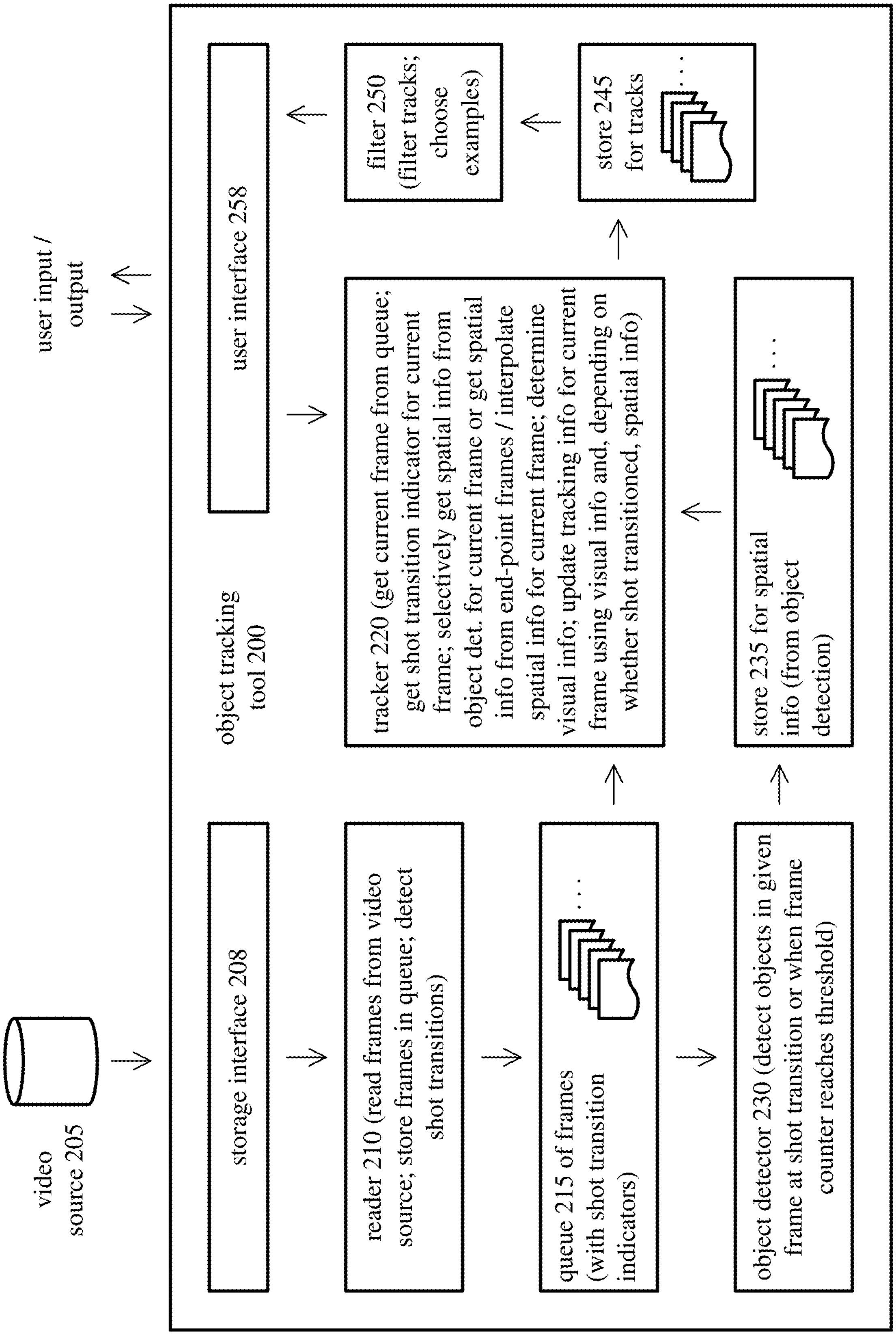
FIG. 2 is a diagram of an example object tracking tool in which some described embodiments can be implemented.

FIG. 2 shows an example object tracking tool (200) that includes a reader (210), tracker (220), object detector (230), and filter (250). The object tracking tool (200) tracks objects through a video sequence. The objects can, for example, be persons, faces, vehicles, logos (textual or symbolic), or another arbitrary type of object. In particular, for a "bring your own model" approach, one or more models used in the object tracking tool can be provided for an arbitrary type of object.

The reader (210) reads frames from a video source (205) through a storage interface (208). The video source (205) can, for example, be storage (170) that stores video content, a media player (146) that produces video content from media, or a camera or other video source (148) that produces video content, as described with reference to FIG. 1. Typically, the video source (205) is magnetic media (such as magnetic disks, magnetic tapes or cassettes), optical disk media and/or other storage or memory media. Alternatively, the video source (205) can be one or more cameras, tuner cards, or other digital video source. The reader (210) puts frames in the queue (210).

The reader (210) also performs operations to detect shot transitions. For example, the reader (210) performs operations as described in section II.A. The reader (210) can also put shot transition indicators (based on the results of shot transition detection) in the queue (215), in association with the respective frames for which the shot transition indicators apply, or in another location.

The queue (215) stores frames of the video sequence. The queue (215) also stores shot transition indicators in association with the respective frames for which the shot transition indicators apply. Alternatively, the shot transition indicators can be stored in another location.

The object tracking tool (200) can manage the maximum queue size of the queue (215), for example, as described in section II.F.

The object detector (230), when called, detects objects in a given frame, which the object detector (230) reads from the queue (215). In particular, the object detector (230) is called to perform object detection operations when a shot transition has been detected in the given frame, or when a frame counter reaches a threshold (e.g., indicating the given frame is the $N^{th}$ frame after the reset of the frame counter), or when an object detection condition is otherwise satisfied (e.g., because there is a shot transition, anywhere in an interval between two end-point frames, that would hurt the accuracy of interpolation between the two end-point frames). The object detector (230) produces spatial information for objects in the given frame, which indicates where the objects are located in the given frame. For example, the object detector (230) identifies bounding boxes around a specific type of object or multiple specific types of objects. (The bounded objects are then used as input for feature extraction.) For a specific type of object (e.g., persons, faces, logos, or another arbitrary type of object), the object detector (230) uses a model trained for that type of object.

In some example implementations, the object detector (230) uses a pose model for persons, which enables the object detector (230) to detect a person in different poses in the given frame. More generally, the object detector (230) can perform various types of object detection operations, such as operations of a single shot detector, a support vector machine, a deformable part model, a convolutional neural network, a region-based convolutional neural network, a recurrent neural network, and/or another neural network. For additional details, see, e.g., section 3.1 and Appendix A of the Ciaparrone paper and references cited therein.

The object detector (230) puts results of the object detection operations for the given frame in the store (235), which stores spatial information from object detection.

The tracker (220) performs operations to manage the object tracking process and also performs operations to extract features, determine affinities for objects in a current frame to objects in other frames, and associate identifiers with objects in the current frame.

The tracker (220) gets the current frame from the queue (215). The tracker (220) also gets the shot transition indicator for the current frame, which indicates whether a shot transition was detected for the current frame. The tracker (220) selectively gets spatial information for objects of the current frame from the object detector (230), which has typically previously determined spatial information for objects of the current frame due to earlier identification of the current frame as a candidate for object detection operations, or from the store (235). For example, the tracker (220) calls the object detector (230), causing the object detector (230) to provide results of previous object detection operations for the current frame, if a shot transition was detected for the current frame, if a frame counter has reached a threshold for the current frame, or if an object detection condition is otherwise satisfied for the current frame (e.g., because there is a shot transition anywhere in an interval, between two end-point frames, that includes the current frame). Or, the tracker (220) retrieves results of previous object detection operations for the current frame from the store (235).

Otherwise, the tracker (220) performs interpolation operations to determine spatial information for objects in the current frame. In particular, from the store (235), the tracker (220) gets spatial information for two end-point frames for an interval that includes the current frame. The tracker (220) checks interpolation conditions. For example, the tracker (220) identifies objects with matching identifiers in the two end-point frames. If an object in each of the two end-point frames has a matching identifier (e.g., ID17 in the first end-point frame and ID17 in the second end-point frame), the tracker (220) performs interpolation operations for the object. The interpolation operations can, for example, use linear interpolation between spatial information for the object in the two end-point frames, scaled according to the relative temporal position of the current frame between the two end-point frames. In this way, the location of the object in the current frame can be determined by interpolation. To the extent the bounding boxes in the two end-point frames have different sizes, the size of the bounding box for the object in the current frame can also be determined by interpolation.

As this example illustrates, interpolation operations for a current frame depend on spatial information for a previous frame and future frame in display order, which define end points of the interval that includes the current frame. Interpolation operations for the current frame also depend on shot transition indicators for other frames in the interval, to confirm that the interval is not interrupted by a shot transition. As such, frames are processed with different timing by the reader (210), the tracker (220), and the object detector (230).

In some cases, interpolation operations are not performed for a current frame because the object detection condition is satisfied for the current frame. For example, this could happen when a shot transition interrupts in an interval between two end-point frames. In such cases, object detection operations can be performed for the current frame. Thus, for an interval that includes a shot transition, object detection operations may be performed for every frame in the interval. Alternatively, a new interval may be defined before or after the shot transition, with spatial information determined by object detection for objects in new end-point frames of the new interval, and with interpolation operations performed to determine spatial information for objects in one or more frames in the new interval.

The tracker (220) also determines visual information for objects in the current frame. The visual information (also called appearance information) indicates visual attributes such as colors and patterns of the objects. For example, using sample values in a bounding box for an object in the current frame, the tracker (220) determines an embedding vector for the object. The embedding vector includes weights for various features according to a model; the respective features of the model might or might not have recognizable real-world significance (e.g., color of hair, color of clothing, facial features). The model can be represented in an embedding table specific to (trained for) a type of object. An embedding table provides different weights for different instances of an object type. In practice, the embedding table can be implemented, for example, with a deep learning neural network or color histogram.

In some example implementations, feature extraction operations use operations of a re-identification model and inference of visual attributes, which are features such as person attributes that can be used for comparison, to determine the visual information for objects in the current frame. With a person attribute model, attributes of an object can be tracked for multiple instances of the object (person) in different frames. For additional details about such approaches, see, e.g., Li et al., "State-Aware Re-Identification Feature for Multi-Target Multi-Camera Tracking," (2019) ("Li paper"). Histograms can be used to represent optional attributes for comparison. More generally, feature extraction operations can include operations of an auto-encoder, a correlation filter, a histogram of oriented gradients, other histogram approach, a long short-term memory network, a linear motion model, a convolutional neural network, a region-based convolutional neural network, a recurrent neural network, or another neural network. For additional details, see, e.g., section 3.2 and Appendix A of the Ciaparrone paper and references cited therein.

In some example implementations, feature extraction operations for objects in a current frame do not change depending on whether a shot transition has been detected for the current frame. Alternatively, feature extraction operations performed for objects in a current frame depend on whether a shot transition has been detected for the current frame.

The tracker (220) also determines affinities between objects in the current frame and objects in other frames (e.g., previous frames). For example, for a given object (instance), the tracker (200) can subsequently find the closest object in an embedding table to make an inference about the given object. For example, using an embedding vector for the given object, the tracker (200) finds a vector in the embedding table (model) that has a minimum distance compared to the embedding vector for the given object. The tracker (200) can then identify other objects associated with that vector in the embedding table. In some example implementations, the tracker (220) uses operations of a re-identification model, to determine affinities for objects in the current frame. For additional details about such approaches, see, e.g., the Li paper.

More generally, to determine the affinities for objects in the current frame, the tracking tool can calculate distance measures between the objects in the current frame and objects, respectively, in other frames (e.g., previous frames). For example, the distance measures can be cosine distance measures, Euclidean distance measures, Mahalanobis distance measures, or other distance measures. The tracking tool can also measure overlap between bounding boxes for the objects in the current frame and the objects, respectively, in the other frames. The tracking tool can also measure motion between the objects in the current frame and the objects, respectively, in the other frames. To determine the affinities, the tracking tool can perform operations of a Kalman filter, a correlation filter, a support vector machine, a long short-term memory network, a convolutional neural network, a region-based convolutional neural network, a recurrent neural network, and/or another neural network. For additional details, see, e.g., section 3.3 and Appendix A of the Ciaparrone paper and references cited therein.

The tracker (220) updates tracking information for objects. In doing so, depending on whether a shot transition has been detected, tracker (220) can adjust operations performed when associating identifiers with objects. In particular, if a shot transition has been detected for the current frame, the tracker (220) uses visual information (but not spatial information) when associating identifiers with objects in the current frame. If no shot transition has been detected for the current frame, the object tracking tool uses both spatial information and visual information when associating identifiers with objects in the current frame. In this way, the likelihood of ID switch events and fragmentation events can be reduced.

In some example implementations, the tracker (220) uses operations of a re-identification model to determine updates (e.g., identifiers) for objects in the current frame. For additional details about such approaches, see, e.g., the Li paper. More generally, to update the tracking information, the tracking tool can use the Hungarian algorithm, region matching, high-order graph matching, reverse nearest neighbor matching, a minimum spanning tree, multiple hypothesis tracking, or another approach. For additional details, see, e.g., section 3.4 and Appendix A of the Ciaparrone paper and references cited therein.

The tracker (220) puts updates to tracking information for the objects in the store (245), which stores tracking information for the respective objects in different tracks.

The filter (250) performs operations to filter tracking information for tracks and to choose representative ("best") instances of objects in the respective tracks. Filtering operations can be performed online, as object tracking is performed, or can be performed in post-processing. Through the user interface (258), results can be presented as output. (User input for the object tracking tool (200) can also be received through the user interface (258).)

One goal of the object tracking tool (200) is to produce tracking information that includes all instances of a given object in a video sequence, so that every appearance of the given object in frames of the video sequence is represented in a track for the given object. Another goal of the object tracking tool (200) is to produce tracking information that is precise (frame-specific) and accurate (without false detections). By setting a detection confidence threshold, the object tracking tool (200) can set a tradeoff that balances these goals. The detection confidence threshold reflects a level of confidence that a detected object is indeed the indicated type of object. If the object tracking tool (200) only accepts detected objects with high confidence, some adequate detected objects may be eliminated, and a track may not be as full as it could be. In some example implementations, the filter (250) applies a very low detection confidence threshold (such that most detected objects are retained) but calculates a per-track confidence. If a track has a high enough confidence (in excess of a track confidence threshold), the track is included in output. The confidence value for a track is calculated as the highest confidence of the detected objects in the track. For additional details about such approaches, see, e.g., Bochinski et al., "High-Speed Tracking-by-Detection Without Using Image Information," IEEE AVS, 6 pp. (2017).

The object tracking tool (200) can be implemented using various types of computer software and hardware. For example, the object tracking tool (200) can be implemented in cloud environment or in a "local" (on-premises) device (e.g., on-premises server computer, home personal computer).

In some example implementations, the object tracking tool is implemented using software executable on one or more CPUs. Alternatively, at least some operations of the object tracking tool (such as object detection operations, feature extraction operations) are implemented using software executable on one or more GPUs. The software can be stored in one or more non-transitory computer-readable media.

D. EXAMPLE PROCESSING FLOWS

Figure 3:
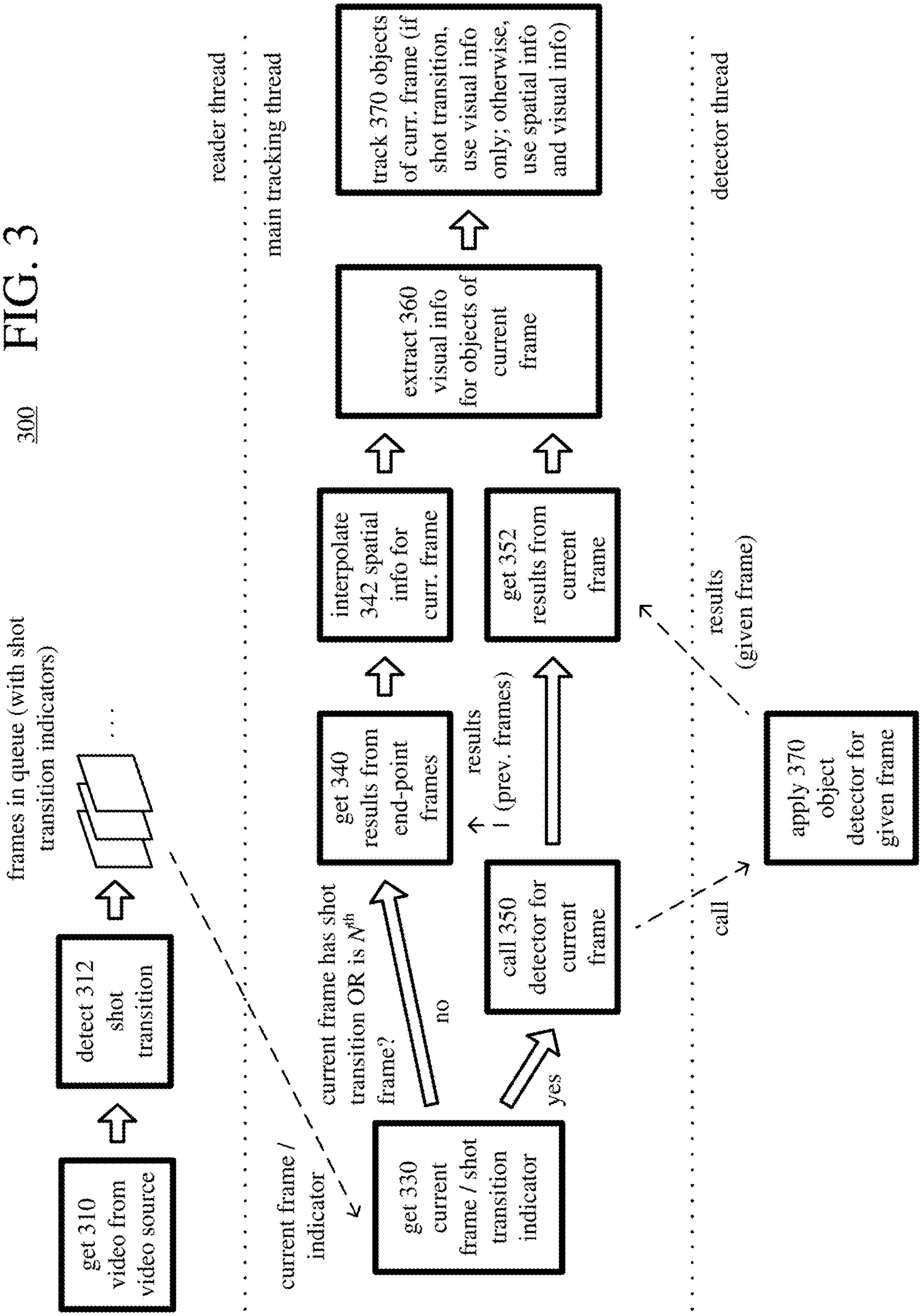
FIG. 3 is a diagram of an example processing flow for object tracking with shot transition detection.

FIG. 3 shows an example processing flow (300) for object tracking with shot transition detection. The example processing flow (300) shows operations performed in a computer system that implements an object tracking tool, as described with reference to FIGS. 1-2 or otherwise.

In the example processing flow (300), the object tracking tool has three main threads-a reader thread, a main tracking thread, and a detector thread. In practice, the object tracking tool can have additional threads for other processes such as overall management, filtering of tracking information, user interface functions, etc. In typical usage scenarios, for the operations assigned to the three main threads, the three main threads are busy most of the time-none of the three main threads is consistently idle/waiting for data to process.

In general, the reader thread reads frames of a video sequence, one frame after another, and stores the frames in a queue along with shot transition indicators for the frames. In the example processing flow (300), on a frame-by-frame basis, the reader thread gets (310) a given frame from a video source, detects (312) any shot transition in the given frame, and stores the given frame and associated shot transition indicator in the queue. To save time and memory, the entire video sequence is not stored in memory. Instead, the queue stores frames and shot transition indicators up to a maximum queue size. Other threads read frames (and associated shot transition indicators) from the queue, removing a given frame (and associated shot transition indicator) from the queue after processing is completed for the given frame. The maximum queue size can be dynamically adjusted, for example, as described in section II.F.

The detector thread performs operations to infer spatial information for objects in a given frame using a detection model. When called by the main tracking thread, the detector thread applies (370) an object detector for the given frame to determine spatial information (such as bounding boxes) for objects in the given frame. The detector thread returns results of the object detection for the given frame to the main tracking thread.

Detecting objects in the given frame can be time-consuming, compared to operations for the given frame in other threads. The detector thread may perform object detection operations for the given frame while the reader thread performs operations to read subsequent frames and detect shot transitions in those subsequent frames, and while the main tracking thread performs operations for a current frame, which can be a frame before the given frame in display order. The main tracking thread can "look ahead" to identify a frame for which an object detection condition is satisfied (e.g., a frame with a shot transition, or for which a frame counter has reached a threshold, or in an interval that includes a shot transition) and call the detector thread for that later frame. Thus, when the main tracking thread performs operations to track objects in a current frame, the main tracking thread may retrieve (from a store of results of previous object detection operations) spatial information for the current frame or retrieve (from the store of results of previous object detection operations; for use in interpolation) spatial information for end-point frames for an interval that includes the current frame, and the detector thread may concurrently perform operations to determine spatial information for objects of a different, future frame.

The main tracking thread performs operations for tracking objects in a current frame. The main tracking thread gets (330) the current frame and its shot transition indicator, reading the current frame and shot transition indicator from the queue filled by the reader thread. The main tracking thread determines whether an object detection condition is satisfied for the current frame. For example, the main tracking thread checks whether the current frame has a shot transition (according to the shot transition indicator) or whether the frame counter has expired at the current frame (the current frame is the $N^{th}$ frame after the object detection condition was last satisfied) or whether the interval between two end-point frames includes any shot transition. If the object detection condition is satisfied, the main tracking thread calls (350) the object detector for the current frame and gets (352) results of object detection for the current frame, which typically have been previously determined by the detector thread, or otherwise gets such results of object detection from a store. If the object detection condition is not satisfied, the main tracking threads gets (340) results of object detection for end-point frames for the interval that includes the current frame, which typically have been previously determined by the detector thread, and interpolates (342) spatial information for the current frame. If the object detection condition is not satisfied for the current frame, but conditions for interpolation are also not satisfied for the current frame, the main tracking thread can call (350) the object detector for the current frame and get (352) results of object detection for the current frame, which may have been previously determined by the detector thread, or otherwise get such results of object detection from a store.

The main tracking thread extracts (360) visual information for objects in the current frame. The main tracking thread then tracks (370) objects of the current frame. When associating identifiers with the objects in the current frame, the main tracking thread uses only visual information for the objects in the current frame if a shot transition has been detected in the current frame. If a shot transition has not been detected in the current frame, the main tracking thread uses both spatial information and visual information for the objects in the current frame when associating identifiers with the objects in the current frame.

E. EXAMPLE TECHNIQUES FOR OBJECT TRACKING WITH SHOT TRANSITION DETECTION

Figure 4A:
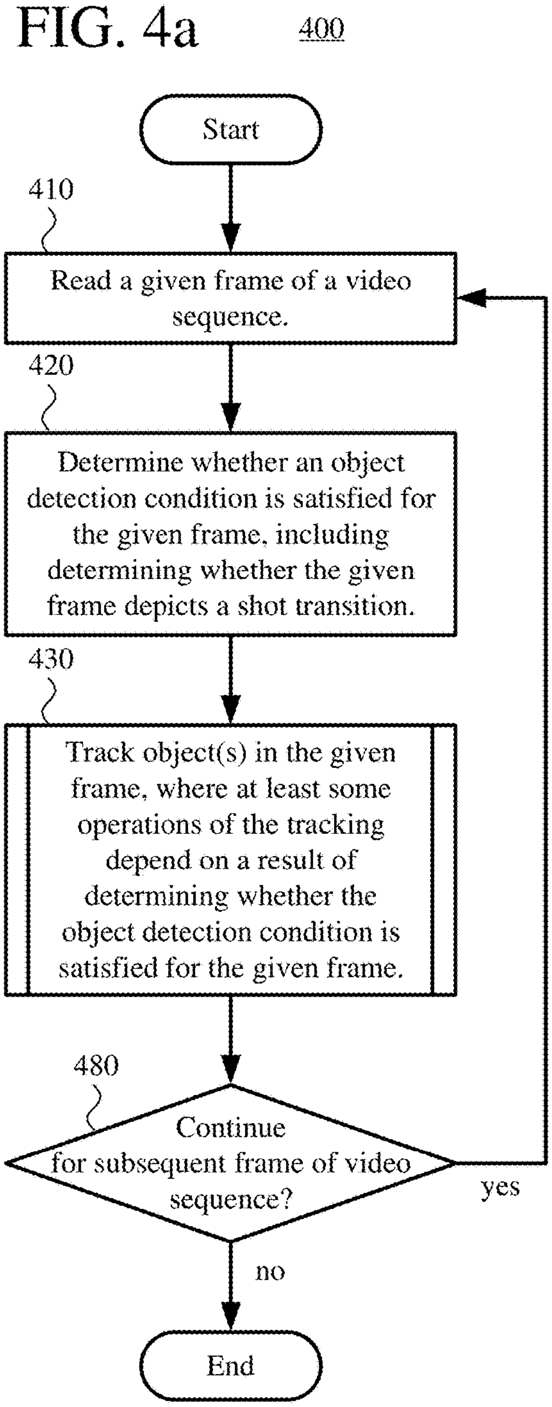
FIG. 4*a* is a flowchart illustrating a generalized technique for object tracking with shot transition detection.
Figure 4B:
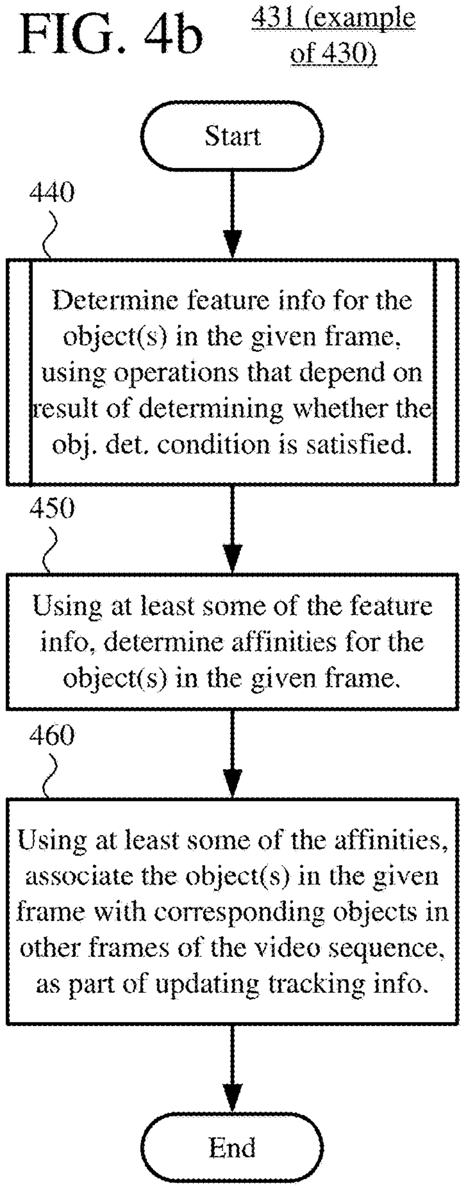
FIG. 4*b* is a flowchart illustrating example operations for one of the operations in FIG. 4*a*.

FIG. 4*a* shows a generalized technique (400) for object tracking with shot transition detection. A computer system that implements an object tracking tool, as described with reference to FIGS. 1-3 or otherwise, can perform the technique (400). FIG. 4*b* shows example operations (431) for one of the operations in FIG. 4*a*, and FIG. 4*c* shows example operations (441) for one of the operations in FIG. 4*b*.

Figure 4C:
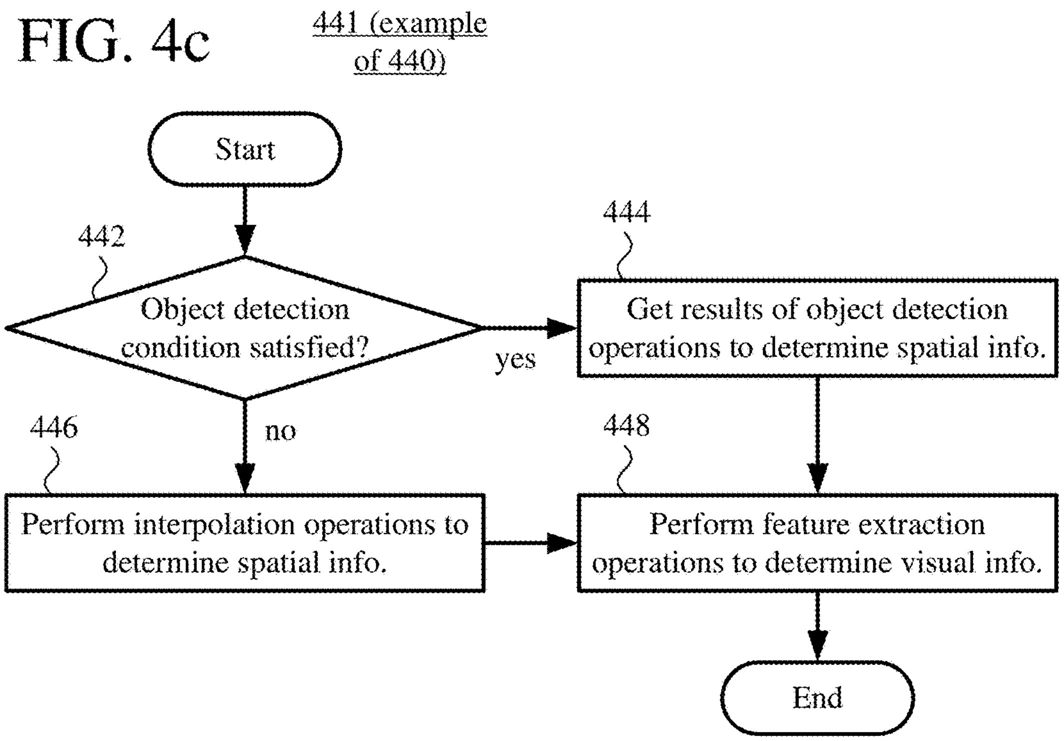
FIG. 4*c* is a flowchart illustrating example operations for one of the operations in FIG. 4*b*.

With reference to FIGS. 4*a*-4*c*, the system that implements the object tracking tool performs operations on frames of a video sequence. In FIGS. 4*a*-4*c*, the operations are shown as being performed on a frame-by-frame basis. In practice, the timing of operations can vary, with some operations being performed concurrently with other operations. For example, as described with reference to FIG. 3, operations to read frames and detect shot transitions can be performed in a first thread (reader thread), operations to decide how to get spatial information for objects in a given frame, extract visual information for the objects in the given frame, and track the objects in the given frame can be performed concurrently in a second thread (tracking thread), and operations to detect objects in selected frames (different than the given frame) can be performed concurrently in a third thread (detector thread). More generally, depending on implementation, the operations shown in FIGS. 4*a*-4*c* can be performed in a different order.

With reference to FIG. 4*a*, the system that implements the object tracking tool reads (410) a given frame of the video sequence. For example, the system that implements the object tracking tool reads the given frame from a video source and stores the given frame in a queue. To do so, the system can determine whether the queue is full. If the queue is not full, after the reading the given frame, the system stores the given frame in the queue. On the other hand, if the queue is temporarily full, the system waits until the queue has room and then stores the given frame in the queue.

The system that implements the object tracking tool manages the queue, which can have a dynamic queue size. When the queue has a dynamic queue size, the system can selectively adjust the maximum queue size of the queue depending on whether a queue condition is satisfied, for example, as described in section II.F.

The system that implements the object tracking tool detects whether the given frame depicts a shot transition. This produces a result of shot transition detection for the given frame, which can be used in subsequent decisions. For example, the system calculates a histogram for the given frame using sample values of the given frame. The system measures differences between the histogram for the given frame and a histogram for a previous frame of the video sequence. The histogram for the previous frame is previously calculated using sample values of the previous frame. The result of shot transition detection depends on the measured differences. For additional explanation, see section II.A.

More generally, the system that implements the object tracking tool can use any of various approaches to detect whether the given frame depicts a shot transition, thereby producing a result of shot transition detection for the given frame. For example, to produce a result of shot transition detection for the given frame, the system can analyze statistical properties of sample values of the given frame compared to statistical properties of one or more previous frames of the video sequence. Or, as another example, to produce a result of shot transition detection for the given frame, the system can analyze encoded data for the given frame (such as frame type for the given frame, slice types for slices of the given frame, statistical properties of prediction residuals for units of the given frame, statistical properties of transform coefficients for prediction residuals for the units of the given frame, and/or statistical properties of motion vectors for the units of the given frame). Or, as another example, to produce a result of shot transition detection for the given frame, the system can analyze results of block matching or other motion estimation between blocks of the given frame and one or more previous frames of the video sequence. Or, as another example, to produce a result of shot transition detection for the given frame, the system can use a spatio-temporal convolutional neural network or other neural network to detect boundaries between different shots. Or, as another example, to produce a result of shot transition detection for the given frame, the system can use a combination of such approaches. Section II.A describes various examples of operations that can be used to detect shot transitions. Alternatively, the system detects shot transitions in some other way.

Depending on implementation, the system can detect any of various types of shot transition. For example, the various types of shot transition can include a viewpoint change in a scene (such as switching between different cameras depicting the same scene), an abrupt scene change (a complete switch between two different scenes), a gradual scene change (blending two scenes in the given frame), a zoom-in, a zoom-out, a fade-in, a fade-out, and a wipe.

With reference to FIG. 4*a*, the system that implements the object tracking tool determines (420) whether an object detection condition is satisfied for the given frame. In particular, when determining whether the object detection condition is satisfied for the given frame, the system determines whether the given frame depicts a shot transition. The object detection condition is satisfied if the given frame depicts a shot transition. For example, the system evaluates a result of shot transition detection for the given frame, which can be determined as described above.

When determining whether the object detection condition is satisfied for the given frame, the system can also determine whether a frame counter has reached a threshold. The object detection condition is satisfied if the frame counter has reached the threshold. In this way, the object detection condition can be satisfied for every $N^{th}$ frame in the absence of a shot transition. For example, the threshold is N, the frame counter is reset to a first value (such as 1) upon the object detection condition being satisfied, and the frame counter is incremented upon the object detection condition not being satisfied. When the frame counter reaches N (for every $N^{th}$ frame, unless a shot transition happens first), the object detection condition is satisfied. Alternatively, the threshold is the first value (such as 1), the frame counter is reset to N upon the object detection condition being satisfied, and the frame counter is decremented upon the object detection condition not being satisfied. When the frame counter reaches the first value (for every $N^{th}$ frame, unless a shot transition happens first), the object detection condition is satisfied.

The value of N depends on implementation. For example, N is 4, 5, 10, or another value. By accounting for shot transitions when evaluating whether the object detection condition is satisfied, the value of N can be increased (compared to approaches that lack shot transition detection). This is because, when shot transition detection is in use, it is safer to assume there is temporal continuity for objects between every $N^{th}$ frame. As a result, overall computational complexity can be reduced, since the computational complexity of operations when the object detection condition is satisfied (e.g., operations for object detection) tends to be much higher than the computational complexity of operations when the object detection condition is not satisfied (e.g., operations for interpolation).

In the preceding examples, the frame counter is reset when a shot transition is detected, such that the given frame starts a new period after which every $N^{th}$ frame causes the object detection condition to be satisfied. Alternatively, the system manages the frame counter independent of shot transition detections. In this case, the object detection condition is satisfied when a shot transition has been detected for the given frame, but the frame counter is not reset.

In some example implementations, when determining whether the object detection condition is satisfied for the given frame, the system can also determine whether a shot transition occurs between two end-point frames on opposite sides of an interval that includes the given frame (where the object detection condition is satisfied for each of the two end-point frames, e.g., because the two end-point frames are N frames apart). The object detection condition is satisfied for the given frame if a shot transition occurs anywhere in the interval between the two end-point frames. In this way, interpolation operations are not used to determine spatial information for the given frame if there is a shot transition that is, although not in the given frame, somewhere else in the interval between the two end-point frames. In this scenario, interpolation operations are not likely to produce useful spatial information for the given frame or any other frame in the interval. As such, object detection operations may be used to determine spatial information for the frames in the interval.

With reference to FIG. 4*a*, the system that implements the object tracking tool tracks (430) one or more objects in the given frame. The object(s) in the given frame can, for example, be persons, faces, vehicles, or logos (textual or symbolic). More generally, the object(s) in the given frame can be any type of object parameterized in one or more models used in the tracking.

At least some operations of the tracking (430) depend on a result of the determining whether the object detection condition is satisfied for the given frame. FIG. 4*b* shows examples of operations for the tracking (430) of object(s) in the given frame. Alternatively, the object(s) in the given frame are tracked in some other way.

The system that implements the object tracking tool checks (480) whether to continue operations for a subsequent frame of the video sequence. If so, the system repeats the reading (410), the determining (420) whether the object detection condition is satisfied, and the tracking (430) the object(s) for the subsequent frame as the given frame. In this way, the system can process, as the given frame, each of multiple frames of the video sequence.

With reference to FIG. 4*b*, the system that implements the object tracking tool determines (440) feature information for the object(s) in the given frame. The feature information for the object(s) in the given frame includes spatial information for the object(s) in the given frame. For example, for one of the object(s) in the given frame, the spatial information indicates location of the object in the given frame. The feature information for the object(s) in the given frame also includes visual information for the object(s) in the given frame. For example, for one of the object(s) in the given frame, the visual information indicates aspects of appearance of the object in the given frame. Alternatively, the feature information for the object(s) in the given frame includes other and/or additional types of information.

FIG. 4*c* shows examples of operations for the determining (440) feature information for the object(s) in the given frame. Alternatively, feature information for the object(s) in the given frame is determined in some other way.

With reference to FIG. 4*c*, the system that implements the object tracking tool checks (442) whether the object detection condition is satisfied for the given frame. If the object detection condition is satisfied, the system gets (444) results of object detection operations to determine spatial information for the object(s) in the given frame. The object detection operations may have already been performed for the given frame, using a look-ahead process to identify the given frame as a candidate for object detection. For example, for one of the object(s) in the given frame, the object detection operations produce a bounding box around the object as the spatial information for the object. The bounding box can be a rectangle parameterized with a width, height, and location. The object detection operations can similarly produce a bounding box for each other object in the given frame. Section II.C describes various examples of object detection operations that can be used to determine spatial information for the object(s) in the given frame. Alternatively, the system determines the spatial information for the object(s) in the given frame in some other way.

Otherwise (the object detection condition is not satisfied for the given frame), the system performs (446) interpolation operations to determine the spatial information for the object(s) in the given frame. For example, for one of the object(s) in the given frame, the system determines spatial information for the object in two end-point frames on opposite sides of the given frame (where the object detection condition is satisfied for each of the two end-point frames, e.g., because the two end-point frames are N frames apart), then interpolates between the spatial information for the object in the two end-point frames. As a condition checked before the interpolation, the system can determine that visual information for the object matches in the two end-point frames or that an identifier for the object matches in the two end-point frames. The system can similarly determine spatial information by interpolation for each other object in the given frame. Section II.C describes various examples of interpolation operations that can be used to determine spatial information for the object(s) in the given frame. Alternatively, the system determines the spatial information for the object(s) in the given frame in some other way.

The system also performs (448) feature extraction operations to determine visual information for the object(s) in the given frame. For example, for one of the object(s) of the given frame, the feature extraction operations produce an embedding vector as the visual information for the object. The feature extraction operations can similarly produce an embedding vector for each other object in the given frame. Section II.C describes various examples of feature extraction operations that can be used to determine visual information for the object(s) in the given frame. Alternatively, the system determines the visual information for the object(s) in the given frame in some other way.

In some example implementations, at least some operations for determining feature information use a set of models adapted for a type of object. The system loads such model(s) before performing such operations to determine feature information.

With reference to FIG. 4*b*, using at least some of the feature information, the system that implements the object tracking tool determines (450) affinities for the object(s) in the given frame. For example, for one of the object(s) in the given frame, the system determines affinity scores relative to objects, respectively, in one or more other frames (e.g., previous frames). The system can repeat such operations for each other object in the given frame. Or, for one of the object(s) of the given frame, the system determines which embedding vector in an embedding table is closest to an embedding vector for the object, then identifies an object in one or more other frames with an embedding vector that is also associated with the embedding vector in the embedding table. The system can repeat such operations for each other object in the given frame. Section II.C describe various examples of operations that can be used to determine affinities for the object(s) in the given frame. Alternatively, the system determines affinities for the object(s) in the given frame in some other way.

In some example implementations, at least some operations for determining affinities use one or more models adapted for a type of object. The system loads such model(s) before performing such operations to determine affinities.

With reference to FIG. 4*b*, using at least some of the affinities, the system that implements the object tracking tool associates (460) the object(s) in the given frame with corresponding objects in other frames of the video sequence, as part of updating tracking information. For example, as part of updating the tracking information, for one of the object(s) in the given frame, the system can assign an identifier to the object. The system can similarly assign identifiers to other objects, respectively, in the given frame. Depending on whether the given frame depicts a shot transition, the type of feature information used (when updating tracking information to associate the object(s) in the given frame with corresponding objects in other frames of the video sequence) can change. If the given frame depicts a shot transition, when updating (460) the tracking information, the system uses only the visual information for the object(s) in the given frame. The spatial information for the object(s) in the given frame is not used. On the other hand, if the given frame does not depict a shot transition, when updating (460) the tracking information, the system uses both the spatial information for the object(s) in the given frame and the visual information for the object(s) in the given frame. Section II.C describes various examples of operations that can be used to update tracking information for the object(s) in the given frame. Alternatively, the system updates tracking information to associate the object(s) in the given frame with corresponding objects in other frames of the video sequence in some other way.

In some example implementations, at least some operations for updating tracking information use one or more models adapted for a type of object. The system loads such model(s) before performing such operations to update tracking information.

The system that implements the object tracking tool can perform various other operations. For example, for one of multiple tracks of the tracking information, the system filters the tracking information in the track and selects a representative object instance for the track. Such operations can be repeated for other tracks among the multiple tracks. Section II.C describes various examples of operations that can be used to filter tracking information and select representative object instances. Alternatively, the system filters tracking information and selects representative object instances in some other way.

FIGS. 4*b* and 4*c* show various operations separately. In practice, at least some operations for determining feature information, determining affinities, or updating tracking information can be combined.

Integration of shot transition detection into an object tracking tool provides various technical advantages, compared to approaches that lack shot transition detection.

In terms of resource utilization, integration of shot transition detection into an object tracking tool can reduce overall computational complexity by enabling a system to perform lower-complexity operations instead of higher-complexity operations when determining spatial information for objects, or by enabling the system to skip some higher-complexity operations entirely. For example, integration of shot transition detection into an object tracking tool can allow the object tracking tool to determine spatial information for objects in a given frame by interpolation instead of performing object detection operations for the objects in the given frame. Thus, by determining whether a given frame depicts a shot transition and adjusting operations accordingly, utilization of resources in a computer system can be reduced.

In terms of quality, integration of shot transition detection into an object tracking tool can improve the accuracy of object tracking. For example, integration of shot transition detection into an object tracking tool can allow the object tracking tool to track objects with fewer instances of identifier switches (e.g., assigning the same identifier to different objects in different frames; or, assigning different identifiers to the same object in different frames). Thus, by determining whether a given frame depicts a shot transition and adjusting subsequent operations accordingly, incidence of identifier switch events for objects tracked in the video sequence can be reduced. As another example, integration of shot transition detection into an object tracking tool can allow the object tracking tool to track objects with fewer instances of fragmentation (e.g., in which tracking of an object only partially covers the actual trajectory of the object through a series of frames). Thus, by determining whether a given frame depicts a shot transition and adjusting subsequent operations accordingly, incidence of fragmentation events for objects tracked in the video sequence can be reduced.

F. EXAMPLE TECHNIQUES FOR DYNAMIC QUEUE RESIZING DURING OBJECT TRACKING

An object tracking tool can dynamically adjust the maximum queue size (also called queue length) for a queue that stores frames of a video sequence. For example, the object tracking tool can selectively increase the maximum queue size, up to a limit, each time the queue gets filled entirely by a reader thread then emptied entirely for a consumer thread such as a main tracking thread. By adjusting the maximum queue size, the object tracking tool reduces the likelihood of the queue being empty when the consumer thread of the object tracking tool is ready to perform object tracking operations for a new frame. This can improve throughput and processor utilization for the object tracking tool.

Figure 5:
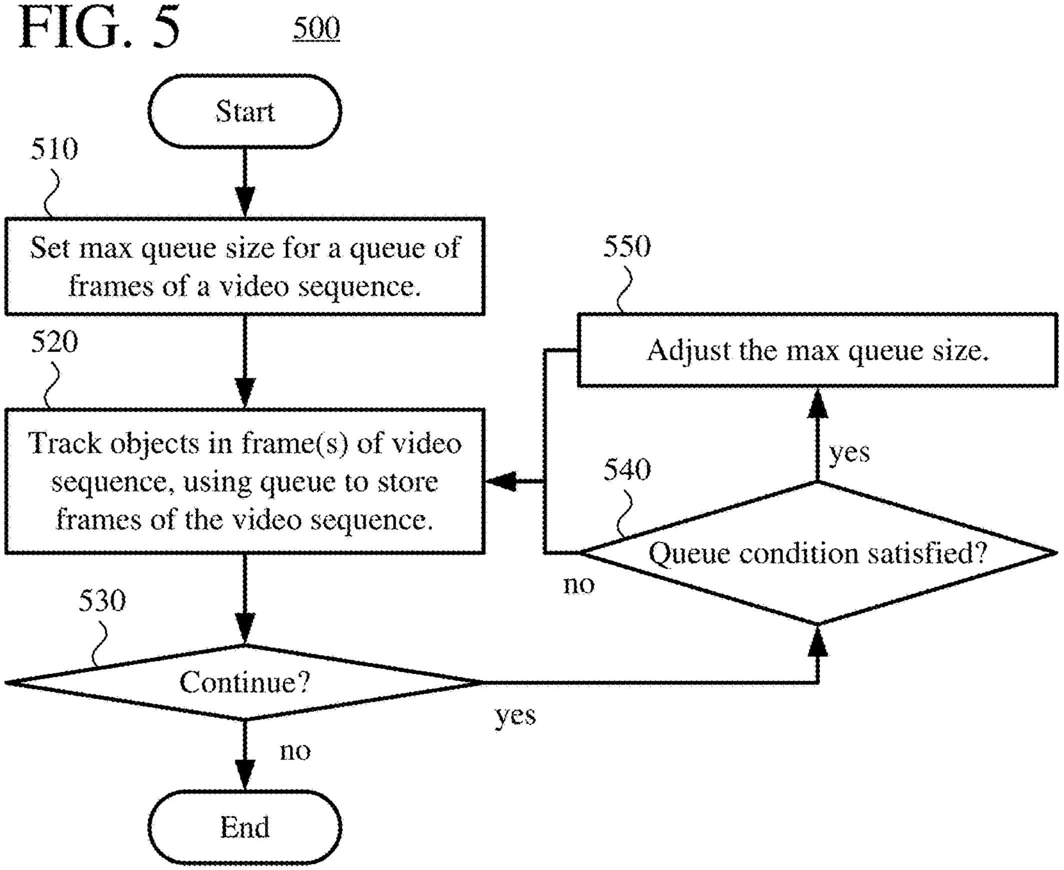
FIG. 5 is a flowchart illustrating a generalized technique for dynamic queue resizing during tracking of objects in a video sequence.

FIG. 5 shows a generalized technique (500) for dynamic queue resizing during tracking of objects in a video sequence. A computer system that implements an object tracking tool, as described with reference to FIGS. 1-3 or otherwise, can perform the technique (500).

With reference to FIG. 5, a system that implements an object tracking tool sets (510) a maximum queue size for a queue of frames of a video sequence. The initial value of the maximum queue size depends on implementation. For example, the initial value is a default value such as 100 frames. Or, the initial value is a final value of the maximum queue size from a prior object tracking session. Or, the initial value of the maximum queue size is set in some other way.

The system that implements an object tracking tool tracks (520) objects in one or more of the frames of the video sequence, using the queue that stores frames of the video sequence. From time to time, the system checks (530) whether to continue the tracking operations.

During the tracking of objects in the frame(s) of the video sequence, the system selectively adjusts the maximum queue size depending on whether a queue condition is satisfied. As shown in FIG. 5, the system checks (540) whether the queue condition is satisfied. For example, the queue condition is satisfied if (1) fullness of the queue has reached the maximum queue size after the maximum queue size was last set or selectively adjusted and (2) the fullness of the queue subsequently reaches an empty state. Alternatively, the queue condition depends on other and/or additional factors.

If the queue condition is satisfied, the system that implements the object tracking tool adjusts (550) the maximum queue size. For example, the system selectively increases the maximum queue size. The system can selectively increase the maximum queue size by a fixed increment that depends on implementation (e.g., 5 frames, 10 frames). Or, the system can selectively increase the maximum queue size by a variable increment (e.g., an increment proportional to the current maximum queue size). Otherwise (the queue condition is not satisfied), the system continues the tracking (520) for one or more subsequent frames of the video sequence.

In some example implementations, a Boolean variable tracks whether the fullness of the queue has reached the maximum queue size after the maximum queue size was last set or selectively adjusted. The Boolean variable is set to a first value when the maximum queue size is initially set or selectively adjusted. The Boolean variable is set to a second value different than the first value when the fullness of the queue reaches the maximum queue size. For example, a Boolean variable was_full is set to false when the maximum queue size is initially set or selectively adjusted, and the Boolean variable was_full is set to true when the fullness of the queue reaches the current maximum queue size.

Figure 6:
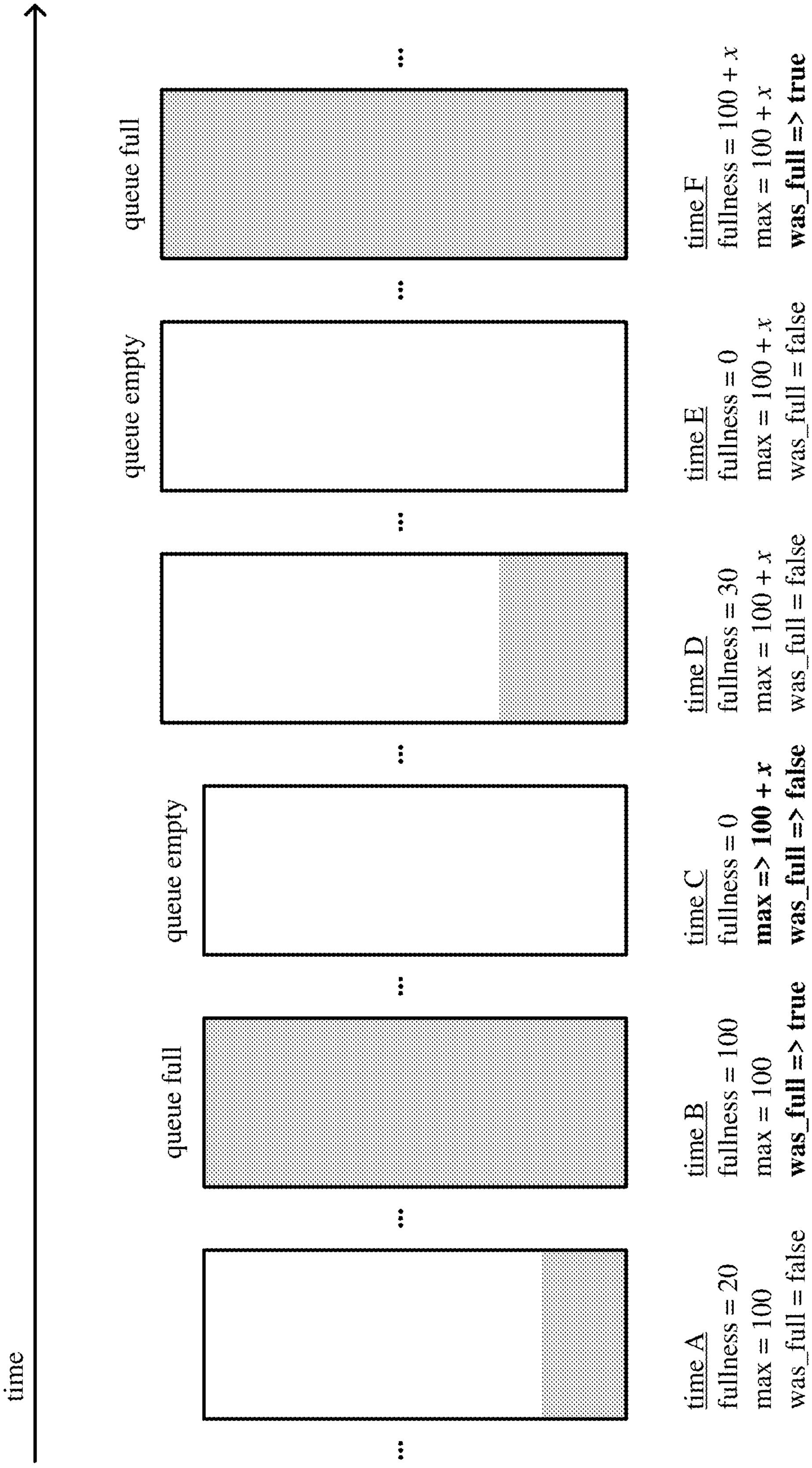
FIG. 6 is a diagram illustrating an example of dynamic queue size adjustment during tracking of objects in a video sequence.

FIG. 6 shows an example (600) of dynamic queue size adjustment during tracking of objects in a video sequence. The example (600) shows a queue at six successive times, which are labeled time A to time F. At each time, the current fullness ("fullness") of the queue in terms of a count of frames in the queue is shown. The current value ("max") for the maximum queue size is also shown for each time. Finally, the Boolean variable was_full is shown for each time. In the example (600) of FIG. 6, the maximum queue length is increased each time the queue reaches an empty state, so long as the queue has reached a full state at least once since the last time it was empty (or the queue was initialized).

At time A, the current fullness of the queue is 20. The maximum queue size is 100. The variable was_full is false, indicating that the maximum queue size has not been reached since the maximum queue size was last set or selectively adjusted.

At time B, the current fullness of the queue is 100—the queue is full. The maximum queue size is still 100. The variable was_full is changed to true, indicating that the maximum queue size has been reached since the maximum queue size was last set or selectively adjusted.

At time C, the current fullness of the queue is 0—the queue is empty. Since the queue condition is satisfied, the maximum queue size is increased from 100 to 100+x, where x indicates an increment to the maximum queue size. The variable was_full is changed to false, since the maximum queue size was just selectively adjusted.

At time D, the current fullness of the queue is 30. The maximum queue size is 100+x. The variable was_full is false, indicating that the maximum queue size has not been reached since the maximum queue size was last selectively adjusted.

At time E, the current fullness of the queue is 0—the queue is empty again. The maximum queue size is 100+x. The variable was_full is false, indicating that the maximum queue size has not been reached since the maximum queue size was last selectively adjusted. Even though the queue is empty, the maximum queue size is not adjusted because the queue has not been full since the maximum queue size was last adjusted.

At time F, the current fullness of the queue is 100+x—the queue is full again. The maximum queue size is still 100+x. The variable was_full is changed to true, indicating that the maximum queue size has been reached since the maximum queue size was last selectively adjusted. The maximum queue size is not selectively adjusted, however, since the queue has not reached an empty state after reaching the full state.

In the examples of FIGS. 5 and 6, the maximum queue size is a count of frames. Alternatively, the maximum queue size can be expressed in terms of a count of bytes or other measure of the size of the queue.

Integration of dynamic queue resizing into an object tracking tool provides various technical advantages, compared to approaches that lack dynamic queue resizing. If a queue that stores frames for input is empty, the object tracking tool may be idle or stalled as it waits for another frame to process. In terms of resource utilization, dynamic queue resizing can reduce the likelihood of the queue being empty. Thus, dynamic queue resizing can improve throughput and processor utilization for the object tracking tool. CL

G. EXAMPLES

The innovative features described herein include the following examples.

| | Example |
|---|---|
| A1 | In a computer system, a method comprising:<br>reading a given frame of a video sequence;<br>determining whether an object detection condition is satisfied for the given frame, including determining whether the given frame depicts a shot transition, the object detection condition being satisfied if the given frame depicts the shot transition; and<br>tracking one or more objects in the given frame, wherein at least some operations of the tracking depend on a result of the determining whether the object detection condition is satisfied for the given frame. |
| A2 | The method of A1, wherein the one or more objects in the given frame are persons, faces, vehicles, logos, or other objects parameterized in one or more models used in the tracking. |

-continued

| | Example |
|---|---|
| A3 | The method of A1 or A2, wherein the determining whether the given frame depicts a shot transition includes evaluating a result of shot transition detection for the given frame, the result of shot transition detection for the given frame having been determined by operations comprising:<br>calculating a given frame histogram using sample values of the given frame; and<br>measuring differences between the given frame histogram and a previous frame histogram, the previous frame histogram having been calculated using sample values of a previous frame of the video sequence. |
| A4 | The method of A1 or A2, wherein the determining whether the given frame depicts a shot transition includes evaluating a result of shot transition detection for the given frame, the result of shot transition detection for the given frame having been determined by operations comprising:<br>analyzing statistical properties of sample values of the given frame compared to statistical properties of one or more other frames of the video sequence;<br>analyzing encoded data for the given frame, including analyzing one or more of frame type for the given frame, slice types for slices of the given frame, statistical properties of prediction residuals for units of the given frame, statistical properties of transform coefficients for prediction residuals for the units of the given frame, and statistical properties of motion vectors for the units of the given frame;<br>analyzing results of block matching or other motion estimation between blocks of the given frame and the one or more previous frames of the video sequence; and/or<br>using spatio-temporal convolutional neural network or other neural network to detect boundaries between different shots. |
| A5 | The method of any one of A1-A4, wherein, compared to an approach that lacks shot transition detection, the determining whether the given frame depicts a shot transition reduces utilization of resources in the computer system. |
| A6 | The method of any one of A1-A4, wherein, compared to an approach that lacks shot transition detection, the determining whether the given frame depicts a shot transition reduces incidence of identifier switches for objects tracked in the video sequence. |
| A7 | The method of any one of A1-A4, wherein, compared to an approach that lacks shot transition detection, the determining whether the given frame depicts a shot transition reduces incidence of fragmentation for objects tracked in the video sequence. |
| A8 | The method of any one of A1-A7, wherein the shot transition is a viewpoint change in a scene, an abrupt scene change, a gradual scene change, a zoom-in, a zoom-out, a fade-in, a fade-out, or a wipe. |
| A9 | The method of any one of A1-A8, wherein the determining whether the object detection condition is satisfied for the given frame further includes determining whether a frame counter has reached a threshold, the object detection condition being satisfied if the frame counter has reached the threshold. |
| A10 | The method of A9, wherein:<br>the threshold is N, the frame counter is reset to a first value upon the object detection condition being satisfied, and the frame counter is incremented upon the object detection condition not being satisfied; or<br>the threshold is the first value, the frame counter is reset to N upon the object detection condition being satisfied, and the frame counter is decremented upon the object detection condition not being satisfied. |
| A11 | The method of any one of A1-A8, wherein the determining whether the object detection condition is satisfied for the given frame further includes:<br>determining whether a shot transition occurs between two end-point frames on opposite sides of the given frame, the object detection condition being satisfied for each of the two end-point frames, wherein the object detection condition is satisfied for the given frame if a shot transition occurs anywhere in an interval between the two end-point frames. |
| A12 | The method of any one of A1-A11, wherein the tracking the one or more objects in the given frame includes:<br>determining feature information for the one or more objects in the given frame, the feature information for the one or more objects in the given frame including spatial information for the one or more objects in the given frame and visual information for the one or more objects in the given frame, wherein the determining the feature information for the one or more objects in the given frame includes:<br>if the object detection condition is satisfied, getting results of object detection operations to determine the spatial information for the one or more objects in the given frame; and<br>otherwise, the object detection condition not being satisfied, performing interpolation operations to determine the spatial information for the one or more objects in the given frame; and<br>performing feature extraction operations to determine the visual information for the one or more objects in the given frame. |
| A13 | The method of A12, wherein, for one of the one or more objects in the given frame, the object detection operations produce a bounding box around the object as the spatial information for the object. |
| A14 | The method of A12, wherein, for one of the one or more objects of the given frame, the feature extraction operations produce an embedding vector as the visual information for the object. |

-continued

| | Example |
|---|---|
| A15 | The method of A12, wherein the performing the interpolation operations includes, for one of the one or more objects in the given frame:<br>determining spatial information for the object in two end-point frames on opposite sides of the given frame, the object detection condition being satisfied for each of the two end-point frames; and<br>interpolating between the spatial information for the object in the two end-point frames. |
| A16 | The method of A15, wherein the performing the interpolation operations further includes:<br>as a condition for the performing the interpolation operations, determining that visual information for the object matches in the two end-point frames or that an identifier for the object matches in the two end-point frames. |
| A17 | The method of A12, wherein, for one of the one or more objects in the given frame, the spatial information indicates location of the object in the given frame. |
| A18 | The method of A12, wherein, for one of the one or more objects in the given frame, the visual information indicates aspects of appearance of the object in the given frame. |
| A19 | The method of any one of A1-A11, wherein the tracking the one or more objects in the given frame further includes:<br>determining feature information for the one or more objects in the given frame;<br>using at least some of the feature information, determining affinities for the one or more objects in the given frame; and<br>using at least some of the affinities, updating tracking information to associate the one or more objects in the given frame with corresponding objects in other frames of the video sequence. |
| A20 | The method of A19, wherein the determining affinities produces, for one of the one or more objects in the given frame, affinity scores relative to objects, respectively, in one or more other frames. |
| A21 | The method of A19, wherein the determining affinities includes, for one of the one or more objects of the given frame, determining which embedding vector in an embedding table is closest to an embedding vector for the object, then identifying an object in one or more other frames with an embedding vector associated with the embedding vector in the embedding table. |
| A22 | The method of A19, wherein the updating the tracking information includes, for one of the one or more objects in the given frame, assigning an identifier to the object. |
| A23 | The method of A19, wherein the feature information for the one or more objects in the given frame includes spatial information for the one or more objects in the given frame and visual information for the one or more objects in the given frame, and wherein:<br>if the given frame depicts a shot transition, the updating the tracking information uses only the visual information for the one or more objects in the given frame, the spatial information for the one or more objects in the given frame not being used; and<br>otherwise, the given frame not depicting a shot transition, the updating the tracking information uses both the spatial information for the one or more objects in the given frame and the visual information for the one or more objects in the given frame. |
| A24 | The method of A19, further comprising, for one of multiple tracks of the tracking information:<br>filtering the tracking information in the track; and<br>selecting a representative object instance for the track. |
| A25 | The method of A19, wherein at least some operations for the determining the feature information, the determining the affinities, and the updating the tracking information use one or more models adapted for a type of object. |
| A26 | The method of A19, wherein at least some operations for the determining the feature information, the determining the affinities, or the updating the tracking information are combined. |
| A27 | The method of any one of A1-A26, further comprising, for each of one or more subsequent frames of the video sequence as the given frame:<br>repeating the reading, the determining whether the object detection condition is satisfied, and the tracking the one or more objects. |
| A28 | The method of any one of A1-A27, further comprising:<br>determining whether a queue is full; and<br>if the queue is not full, after the reading the given frame, storing the given frame in the queue. |
| A29 | The method of A28, wherein the queue has a maximum queue size, the method further comprising:<br>selectively adjusting the maximum queue size depending on whether a queue condition is satisfied. |
| A30 | One or more non-transitory computer-readable media having stored thereon computer-executable instructions for causing one or more processing units, when programmed thereby, to perform operations for the method of any one of A1-A29. |
| A31 | A computer system comprising one or more processing units and memory, the computer system being configured to perform operations for the method of any one of A1-A29. |

-continued

| | Example |
|---|---|
| A32 | The computer system of A31, wherein the computer system is implemented in a cloud environment. |
| A33 | The computer system of A31, wherein the computer system is implemented in an on-premises device. |
| A34 | The computer system of A31, wherein the one or more processing units include a central processing unit configured to perform the operations of the method. |
| A35 | The computer system of A31, wherein the one or more processing units include one or more graphics processing units configured to perform some of the operations of the method, and wherein the one or more processing units further include a central processing unit configured to perform remaining ones the operations of the method. |
| A36 | One or more non-transitory computer-readable media having stored thereon the tracking information produced by operations for the method of any one of A1-A29. |
| B1 | In a computer system, a method comprising: setting a maximum queue size for a queue of frames of a video sequence; and during tracking of objects in one or more of the frames of the video sequence, selectively adjusting the maximum queue size depending on whether a queue condition is satisfied. |
| B2 | The method of B1, wherein the queue condition is satisfied if (1) fullness of the queue has reached the maximum queue size after the maximum queue size was last set or selectively adjusted and (2) the fullness of the queue subsequently reaches an empty state. |
| B3 | The method of B2, wherein a Boolean variable tracks whether the fullness of the queue has reached the maximum queue size after the maximum queue size was last set or selectively adjusted, the Boolean variable being set to a first value when the maximum queue size is set or selectively adjusted, and the Boolean variable being set to a second value different than the first value when the fullness of the queue reaches the maximum queue size. |
| B4 | The method of any one of B1-B3, wherein the selectively adjusting the maximum queue size is selectively increasing the maximum queue size. |
| B5 | The method of B4, wherein the maximum queue size is selectively adjusted by a fixed increment. |
| B6 | The method of any one of B1-B5, wherein compared to an approach that lacks dynamic queue resizing, the selectively adjusting the maximum queue size reduces likelihood of the queue being empty, which could cause the object tracking tool to be idle or stalled. |
| B7 | One or more non-transitory computer-readable media having stored thereon computer-executable instructions for causing one or more processing units, when programmed thereby, to perform operations for the method of any one of B1-B6. |
| B8 | A computer system comprising one or more processing units and memory, the computer system being configured to perform operations for the method of any one of B1-B6. |
| B9 | The computer system of B8, wherein the computer system is implemented in a cloud environment. |
| B10 | The computer system of B8, wherein the computer system is implemented in an on-premises device. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method comprising:

reading a given frame of a video sequence;

determining whether an object detection condition is satisfied for the given frame, including determining whether the given frame depicts a shot transition, wherein the object detection condition for the given frame depends at least in part on whether the given frame depicts the shot transition, the object detection condition being satisfied if the given frame depicts the shot transition; and tracking an object in the given frame, including determining feature information for the object in the given frame, wherein the feature information for the object in the given frame includes spatial information for the object in the given frame and visual information for the object in the given frame, and wherein the determining the feature information for the object in the given frame includes:

selecting between different tracking operations to determine at least some of the feature information for the object in the given frame depending on a result of the determining whether the object detection condition is satisfied for the given frame; and responsive to the object detection condition not being satisfied:

performing interpolation operations to determine the spatial information for the object in the given frame, including:

as a condition for the performing the interpolation operations, determining that visual information for the object matches in two end-point frames on opposite sides of the given frame or that an identifier for the object matches in the two end-point frames;

determining spatial information for the object in the two end-point frames, the object detection condition being satisfied for each of the two end-point frames; and interpolating between the spatial information for the object in the two end-point frames; and performing feature extraction operations to determine the visual information for the object in the given frame.

2. The method of claim 1, wherein the determining whether the given frame depicts a shot transition includes evaluating a result of shot transition detection for the given frame, the result of shot transition detection for the given frame having been determined by shot transition detection operations comprising:

calculating a given frame histogram using sample values of the given frame; and measuring differences between the given frame histogram and a previous frame histogram, the previous frame histogram having been calculated using sample values of a previous frame of the video sequence.

3. The method of claim 1, wherein the determining whether the given frame depicts a shot transition includes evaluating a result of shot transition detection for the given frame, the result of shot transition detection for the given frame having been determined by shot transition detection operations comprising:

analyzing statistical properties of sample values of the given frame compared to statistical properties of another frame of the video sequence;

analyzing encoded data for the given frame, including analyzing one or more of frame type for the given frame, slice types for slices of the given frame, statistical properties of prediction residuals for units of the given frame, statistical properties of transform coefficients for prediction residuals for the units of the given frame, and statistical properties of motion vectors for the units of the given frame;

analyzing results of block matching or other motion estimation between blocks of the given frame and a previous frame of the video sequence; and/or using spatio-temporal convolutional neural network or other neural network to detect boundaries between different shots.

4. The method of claim 1, wherein the shot transition is a viewpoint change in a scene, an abrupt scene change, a gradual scene change, a zoom-in, a zoom-out, a fade-in, a fade-out, or a wipe.

5. The method of claim 1, wherein the determining whether the object detection condition is satisfied for the given frame further includes determining whether a frame counter has reached a threshold, and wherein the object detection condition for the given frame further depends at least in part on whether the frame counter has reached the threshold, the object detection condition being satisfied if the frame counter has reached the threshold.

6. The method of claim 1, wherein the determining whether the object detection condition is satisfied for the given frame further includes:

determining whether an in-interval shot transition occurs anywhere in an interval between the two end-point frames, wherein the object detection condition for the given frame further depends at least in part on whether the in-interval shot transition occurs anywhere in the interval between the two end-point frames.

7. The method of claim 1, wherein, for the object in the given frame:

the spatial information indicates location of the object in the given frame; and the visual information indicates aspects of appearance of the object in the given frame.

8. The method of claim 1, wherein the tracking the object in the given frame further includes:

using at least some of the feature information, determining affinities for the object in the given frame; and using at least some of the affinities, associating the object in the given frame with corresponding objects in other frames of the video sequence as part of updating tracking information.

9. The method of claim 8, wherein:

the given frame not depicting a shot transition, the updating the tracking information uses both the spatial information for the object in the given frame and the visual information for the object in the given frame.

10. The method of claim 8, further comprising, for one of multiple tracks of the tracking information:

filtering the tracking information in the track; and selecting a representative object instance for the track.

11. The method of claim 8, wherein at least some operations for the determining the feature information, the determining the affinities, and the updating the tracking information use a set of models adapted for a type of object.

12. The method of claim 1, further comprising:

determining that a queue is not full; and after the reading the given frame, storing the given frame in the queue.

13. The method of claim 12, wherein the queue has a maximum queue size, the method further comprising:

selectively adjusting the maximum queue size depending on whether a queue condition is satisfied.

14. A non-transitory computer-readable medium having stored thereon computer-executable instructions for causing a processing system, when programmed thereby, to perform operations comprising:

reading a given frame of a video sequence;

determining whether an object detection condition is satisfied for the given frame, including determining whether the given frame depicts a shot transition, the object detection condition being satisfied if the given frame depicts the shot transition; and tracking an object in the given frame, including determining feature information for the object in the given frame, wherein the feature information for the object in the given frame includes spatial information for the object in the given frame and visual information for the object in the given frame, and wherein the determining the feature information for the object in the given frame includes:

selecting between different tracking operations to determine at least some of the feature information for the object in the given frame depending on a result of the determining whether the object detection condition is satisfied for the given frame; and responsive to the object detection condition not being satisfied:

performing interpolation operations to determine the spatial information for the object in the given frame, including:

as a condition for the performing the interpolation operations, determining that visual information for the object matches in two end-point frames on opposite sides of the given frame or that an identifier for the object matches in the two end-point frames;

determining spatial information for the object in the two end-point frames, the object detection condition being satisfied for each of the two end-point frames; and interpolating between the spatial information for the object in the two end-point frames; and performing feature extraction operations to determine the visual information for the object in the given frame.

15. A computer system comprising a processing system and memory, the computer system being configured to perform operations comprising:

reading a given frame of a video sequence;

determining whether an object detection condition is satisfied for the given frame, including determining whether the given frame depicts a shot transition, the object detection condition being satisfied if the given frame depicts the shot transition; and tracking an object in the given frame, including determining feature information for the object in the given frame, wherein the feature information for the object in the given frame includes spatial information for the object in the given frame and visual information for the object in the given frame, and wherein the determining the feature information for the object in the given frame includes:

selecting between different tracking operations to determine at least some of the feature information for the object in the given frame depending on a result of the determining whether the object detection condition is satisfied for the given frame; and responsive to the object detection condition not being satisfied:

performing interpolation operations to determine the spatial information for the object in the given frame, including:

as a condition for the performing the interpolation operations, determining that visual information for the object matches in two end-point frames on opposite sides of the given frame or that an identifier for the object matches in the two end-point frames;

determining spatial information for the object in the two end-point frames, the object detection condition being satisfied for each of the two end-point frames; and interpolating between the spatial information for the object in the two end-point frames; and performing feature extraction operations to determine the visual information for the object in the given frame.

16. The computer system of claim 15, wherein the feature information for the object in the given frame includes spatial information for the object in the given frame and visual information for the object in the given frame.

17. The computer system of claim 16, wherein, for the object in the given frame:

the spatial information indicates location of the object in the given frame; and the visual information indicates aspects of appearance of the object in the given frame.

18. The computer system of claim 16, wherein the object detection condition is satisfied, and wherein the determining the feature information for the object in the given frame includes:

getting results of object detection operations to determine the spatial information for the object in the given frame; and performing feature extraction operations to determine the visual information for the object in the given frame.

19. The computer system of claim 18, wherein, for the object in the given frame:

the object detection operations produce a bounding box around the object as the spatial information for the object; and the feature extraction operations produce an embedding vector as the visual information for the object.

20. The computer system of claim 16, wherein the object detection condition is not satisfied, and wherein the determining the feature information for the object in the given frame includes:

performing interpolation operations to determine the spatial information for the object in the given frame; and performing feature extraction operations to determine the visual information for the object in the given frame.

* * * * *